3,773,835
METHOD FOR PRODUCING 2-ACETYL-7-
METHOXY - 1,2,3,4,9,10 - HEXAHYDRO-
PHENANTHRENE
Horst Gottschalk and Hans-Georg Schulz, Hamburg, Germany, assignors to Hans Schwarzkopf GmbH, Hamburg, Germany
No Drawing. Filed Sept. 3, 1971, Ser. No. 177,825
Int. Cl. C07c 49/76
U.S. Cl. 260—586 H
6 Claims

ABSTRACT OF THE DISCLOSURE

This invention relates to the preparation of 2-acetyl-7-methoxy-1,2,3,4,9,10-hexahydrophenanthrene from 2-acetyl-7-methoxy-1,2,3,9,10,10a - hexahydrophenanthrene by rearrangement using halogens.

---

The present invention relates to a method for producing 2-acetyl-7-methoxy-1,2,3,4,9,10-hexahydrophenanthrene.

The production of 2-acetyl-7-methoxy-1,2,3,4,9,10-hexahydrophenanthrene by rearrangement of 2-acetyl-7-methoxy-1,2,3,9,10,10a - hexahydrophenanthrene is known from U.S. Pat. 2,894,958, which describes the rearrangement in an acid solution using hydrogen chloride. According to Example 2 of the above-mentioned patent, the reaction time in the acid solution lasts for ten minutes, after which the solvent is evaporated. From this it may be gathered that the rearrangement of large quantities of 2 - acetyl - 7 - methoxy-1,2,3,9,10,10a-hexahydrophenanthrene is impossible since the reaction time could not be adhered to. If the acid is allowed to act for too long a period of time, there is a danger of the product being decomposed.

It has now been found that the rearrangement of 2-acetyl-7-methoxy-1,2,3,9,10,10a-hexahydrophenanthrene into 2 - acetyl - 7 - methoxy - 1,2,3,4,9,10 - hexahydrophenanthrene may be carried out very easily, and in batches as large as may be desired, with no danger of decomposing the product, if the compound is heated with very small quantities of a halogen in an inert solvent. All that is required after this is to evaporate the solvent in order to obtain the product of the rearrangement in a quantitative yield.

The reaction is advantageously carried out in an inert solvent. Preferred solvents for use in the present invention are heptane and benzene.

According to Example 1 of U.S. Pat. 2,894,958, 2-acetyl-7-methoxy-1,2,3,9,10,10a-hexahydrophenanthrene may be produced by reacting 1-vinyl-6-methoxy-3,4-dihydronaphthalene with methyl vinyl ketone. When the 1-vinyl-6-methoxy-3,4-dihydronaphthalene is produced by dehydrating 1-vinyl-1-hydroxy - 6 - methoxy-1,2,3,4-tetrahydronaphthalene using a halogen as a catalyst, the raw product obtained after the solvent has been distilled off, may be reacted directly with methyl vinyl ketone to produce 2-acetyl - 7 - methoxy-1,2,3,4,9,10-hexahydrophenanthrene. It is not necessary to isolate the 2-acetyl-7-methoxy-1,2,3,9,10,10a-hexahydrophenanthrene since sufficient halogen for the rearrangement is present in the solution. After the reaction with methyl vinyl ketone has been completed in a manner similar to that given in Example 1 of U.S. Pat. 2,894,958, then 2-acetyl-7-methoxy-1,2,3,4,9,10-hexahydrophenanthrene is obtained directly, instead of 2-acetyl-7-methoxy-1,2,3,9,10,10a-hexahydrophenanthrene.

EXAMPLE 1

0.10 g. of 2-acetyl-7-methoxy-1,2,3,9,10,10a-hexahydrophenanthrene was dissolved in 50 ml. of benzene. After the addition of 0.13 mg. of iodine, the mixture was heated in reflux to boiling for four hours. After the benzene had been distilled off, 0.10 g. of 2-acetyl-7-methoxy-1,2,3,4,9,10-hexahydrophenanthrene was obtained. The compound had a melting point of 86° C. The mix-melting-point with 2-acetyl-7-methoxy-1,2,3,9,10,10a-hexahydrophenanthrene was lowered.

EXAMPLE 2

0.10 g. of 2-acetyl-7-methoxy-1,2,3,9,10,10a-hexahydrophenanthrene was dissolved in 50 ml. of heptane. After the addition of 0.3 mg. of bromine in heptane, the mixture was heated in reflux to boiling for six hours. After the heptane had been distilled off, 0.10 g. of 2-acetyl-7-methoxy-1,2,3,4,9,10-hexahydrophenanthrene with a melting point of 86° C. was obtained. The mix-melting-point with 2-acetyl-7-methoxy-1,2,3,9,10,10a-hexahydrophenanthrene was lowered.

EXAMPLE 3

30.5 g. of 1-vinyl-1-hydroxy-6-methoxy-1,2,3,4-tetrahydronaphthalene were dissolved in 80 ml. of benzene, 0.2 g. of N-phenyl-β-naphthylamine and 0.04 g. of iodine were added, and the mixture was heated to boiling. The water formed was collected in a water separator. After twenty minutes the benzene was distilled off in vacuo.

125 ml. of heptane and 29 ml. of methyl vinyl ketone were added to the oil. The mixture was heated for four hours in reflux, after which the solvent and the excess methyl vinyl ketone were removed by distillation in vacuo. After crystallizing with methanol, 2-acetyl-7-methoxy-1,2,3,4,9,10-hexahydrophenanthrene with a melting point of 86° C. was obtained. The mix-melting-point with 2-acetyl-7-methoxy-1,2,3,9,10,10a-hexahydrophenanthrene was lowered.

What we claim as our invention is:

1. A process for the preparation of 2-acetyl-7-methoxy-1,2,3,4,9,10-hexahydrophenanthrene in which 2-acetyl-7-methoxy-1,2,3,9,10,10a-hexahydrophenanthrene is isomerized with a catalytic quantity of a halogen selected from the group of iodine and bromine by heating in reflux to boiling in the presence of an inert solvent.

2. A process as claimed in claim 1, in which the inert solvent is heptane or benzene.

3. A process as claimed in claim 1 in which the halogen is iodine.

4. A process as claimed in claim 1, in which the halogen is bromine.

5. A process as claimed in claim 3, in which the 2-acetyl-7-methoxy-1,2,3,9,10,10a - hexahydrophenanthrene is produced by dehydrating 1-vinyl-1-hydroxy-6-methoxy-1,2,3,4-tetrahydronaphthalene by means of iodine and then reacting the resultant 1-vinyl-6-methoxy-3,4,-dihydronaphthalene with methyl vinyl ketone.

6. A process as claimed in claim 5, in which the 2-acetyl-7-methoxy-1,2,3,9,10,10a - hexahydrophenanthrene so produced contains a catalytic quantity of iodine and is immediately converted to the 2-acetyl-7-methoxy-1,2,3,4,9,10-hexahydrophenanthrene without any intermediate isolation step.

References Cited
UNITED STATES PATENTS 2,894,958    7/1959    Goldberg et al. \_\_ 260—586 H X BERNARD HELFIN, Primary Examiner G. A. SCHWARTZ, Assistant Examiner